US Patent [15] 3,640,186
Lundstrom [45] Feb. 8, 1972

[54] CYLINDER FOR ULTRAHIGH PRESSURE

[72] Inventor: Hans Lundstrom, Robertsfors, Sweden
[73] Assignee: Allmanna Svenska Elektriska Aktiebolaget, Vasteras, Sweden
[22] Filed: Jan. 12, 1970
[21] Appl. No.: 2,322

[30] Foreign Application Priority Data

Jan. 29, 1969 Sweden..................................1148/69

[52] U.S. Cl. .............................................92/169, 138/30
[51] Int. Cl. ....................F161 9/22, F161 9/16, F02f 1/00
[58] Field of Search ..................92/169; 123/193 C; 138/28, 138/30

[56] References Cited

UNITED STATES PATENTS

| | | | |
|---|---|---|---|
| 2,495,693 | 1/1950 | Byrd et al. | 138/30 |
| 2,770,259 | 11/1956 | Zallea | 138/121 |
| 2,896,667 | 8/1959 | Jumba | 138/30 |
| 2,918,090 | 12/1959 | Shelly | 138/30 |
| 2,908,294 | 10/1959 | Mattia et al. | 138/30 |
| 3,276,478 | 10/1966 | Bleasdale | 138/30 |

Primary Examiner—Edgar W. Geoghegan
Assistant Examiner—Allen M. Ostrager
Attorney—Jennings Bailey, Jr.

[57] ABSTRACT

A high-pressure cylinder for hydrostatic extrusion is formed of an inner tube, a prestressed outer tube around the inner tube and a prestressed sheath surrounding the outer tube. The inner tube is of such a structure that pressure medium introduced into the cylinder can reach the outer side of the inner tube. When the pressure in the cylinder is low, the inner tube takes up pressure from the outer tube, whereas when the pressure is increased the outer tube is expanded out of contact with the inner tube. The inner tube may be formed of three tube sectors with longitudinal radial partition surfaces.

6 Claims, 4 Drawing Figures

CYLINDER FOR ULTRAHIGH PRESSURE

BACKGROUND OF THE INVENTION

1. Field of the Invention

The present invention relates to a cylinder for ultrahigh pressure, primarily for pressure chambers in presses for hydrostatic extrusion.

2. The Prior Art

In hydrostatic extrusion the possible area reduction ratio S, which is the ratio between the cross-sectional area of a billet and the cross-sectional area of the product formed, increases extremely rapidly with increasing pressure. Thus, for example, a pressure of about 17 kilobar is required when extruding copper in order to achieve an area reduction ratio $S \cong 60$, whereas at a pressure of 25 kilobar an area reduction ratio $S \cong 1,000$ can be obtained. A pressure increase of about 50 percent gives an increase in area reduction ratio S of about 1,700 percent. The production capacity and thus the competitive value of extrusion equipment are thus directly proportional to the area reduction ratio which can be obtained and are therefore extremely dependent on the possibility of manufacturing a pressure chamber having sufficiently long life at high pressures. At the high pressures occurring the material in the innermost part of the pressure chamber cylinder is subjected to extremely high stresses. The construction materials used are brittle and tangential tensile stresses cannot without risk be permitted at the inner tube surface in the cylinder. In a cylinder intended for 30 kilobar and having one or more tubes surrounded by a prestressed sheath, with a diameter ratio of $D_i d_1 \approx 10:1$, the average value and amplitude of the comparison stress will be high. An increase in the diameter ratio $D_2/d$ to above 10:1 offers no practical way to increase the stresses in the tube wall. The material in the outermost layer of the cylinder then offers negligible additional strength. According to the invention the average value and amplitude of the equivalent tensile stress is decreased by inserting a tube or lining in the tube in the high-pressure cylinder upon which the pressure medium acts this lining being sole for the purpose of support. The high-pressure cylinder according to the invention comprises at least one inner support tube surrounded by at least one support tube which, when the high-pressure cylinder is unloaded, is prestressed and a cylindrical sheath around this second support tube, which sheath is formed by wire or metal strip wound on under prestressing, or of additional prestressed tubes. At high pressure the support tube is completely free inside the surrounding prestressed tube which takes up the pressure. The cylinder is substantially characterized in that between the space inside the support tube and the inner surface of the surrounding tube there is at least one channel or gap through which pressure medium can pass through or past the wall of the inner, support tube. In one embodiment the inner tube, support tube, is built up of a number of tube sectors having longitudinal radial partition surfaces. One advantage of this embodiment is that the pressure medium in the cylinder opens the gaps when the tangential stresses in the support tube have decreased to zero. The risk of the support tube being subjected to tensile stresses due to clogged channels is thus completely eliminated. It is therefore possible to use hard metal (carbides) in the support tube which stands a tangential stress of 400 kg./mm.². The use of a support tube of hard metal which, due to prestressing of the surrounding tube and sheath when the pressure cylinder is not loaded, is fully exploited from the strength point of view decreases the stresses in the tube taking up the liquid pressure considerably. In a cylinder for 30 kilobar operating pressure corresponding to that mentioned earlier, the maximum equivalent tensile stress is decreased by 16 percent and that the amplitude of the equivalent tensile stress is decreased by about 34 percent. At lower pressures the maximum value and amplitude of the equivalent tensile stress are reduced even further. The decrease in amplitude of the stress is of considerable importance from the fatigue point of view and means that the lifetime of the cylinder is substantially increased. Another advantage with the invention is that rupture in the most heavily loaded unit of the cylinder, the support tube, can hardly cause any secondary damage.

The support tube may also have a number of radial through holes or through slits perpendicular to the tube. It is also possible to arrange gaps at the ends of the tube or to divide the tube into several parts so that radial gaps are formed between adjacent end surfaces of the tube parts.

BRIEF DESCRIPTION OF THE DRAWINGS

The invention is described further with reference to the accompanying drawings.

DESCRIPTION OF THE PREFERRED EMBODIMENTS

Figure 1:
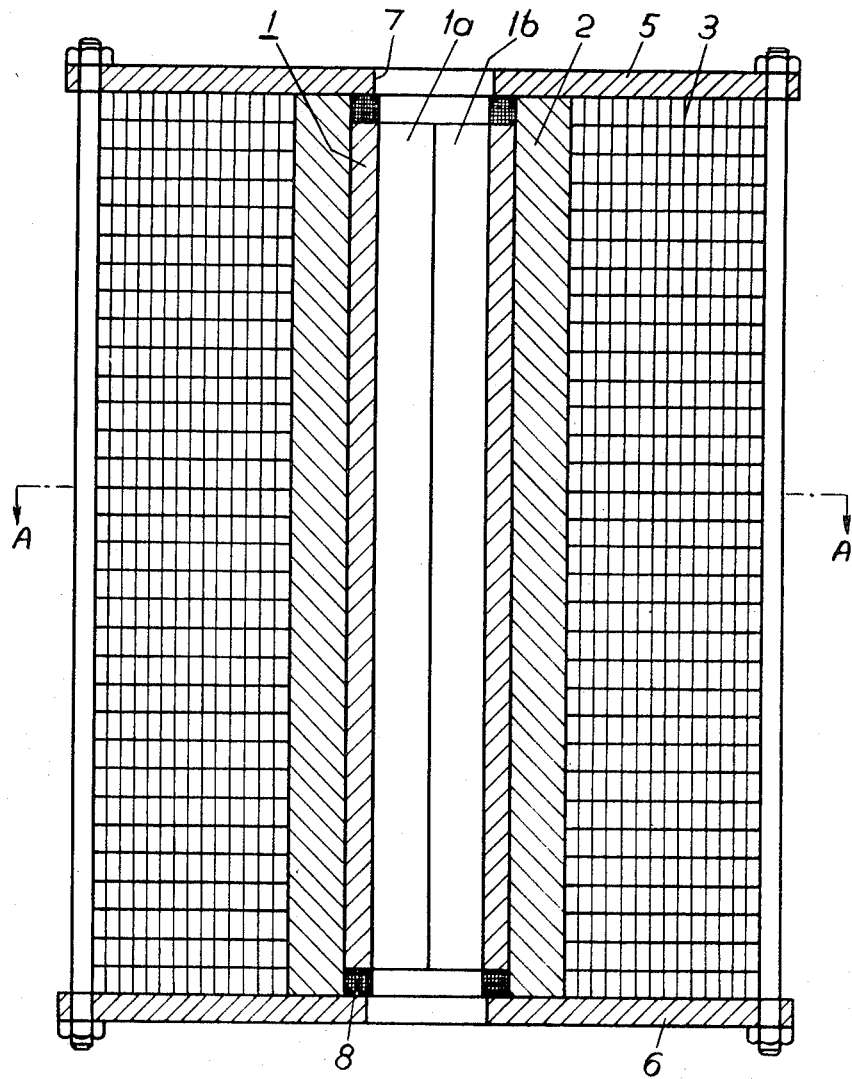
FIG. 1 shows a longitudinal section through a high-pressure cylinder which is part of a high-pressure chamber for a press for hydrostatic extrusion.
Figure 2:
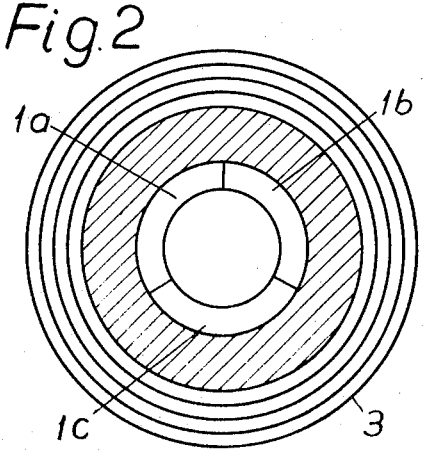
FIGS. 2 and 3 show a cross section of the cylinder when not loaded and loaded, respectively, by a pressure medium enclosed therein which is under high pressure.
Figure 3:
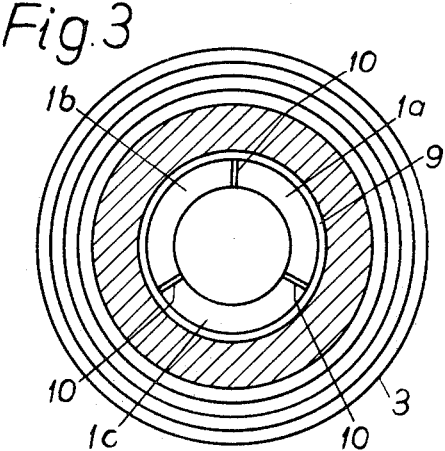

In the drawings, 1 designates a support tube which is constructed of the three tube segments 1a, 1b and 1c. Outside this tube is a prestressed tube 2 and a sheath 3 of rectangular metal strip wound on under prestressing. The strip sheath is held together by bolts 4 and annular end pieces 5 and 6. At the ends of the tube 1 are washers 7 and 8. The washer 8 seals between the tube 2 and a die, not shown, whereas the washer 7 seals between the tube 2 and a punch, not shown, which is pushed into the cylinder and generates the pressure required for the extrusion. FIG. 2 shows in section an unloaded cylinder. The prestressing in the tube 2 and sheath 3 is normally selected so that the tangential pressure stress at the inner surface of the support tube reaches the maximum value permitted. The radial pressure between the tube 2 and the tube 1 is then normally less than 50 percent of the construction pressure of the cylinder. When the cylinder is subjected to an inner overpressure, it expands so that the pressure stress decreases in the tubes 1 and 2. Since the tube 1 is built up of segments it can never take up an inner overpressure and be subjected to tangential tensile stress. When the pressure reaches a certain level and the stress in the tube 1 has fallen to zero a gap 9 is formed between the tubes 1 and 2 since the pressure medium can seep through the gaps 10 to the wall of the tube 2. It is suitable also to choose the prestressing in the tube 2 so that the tangential stress at the inner surface of the tube 2 is almost zero at the construction pressure.

Figure 4:
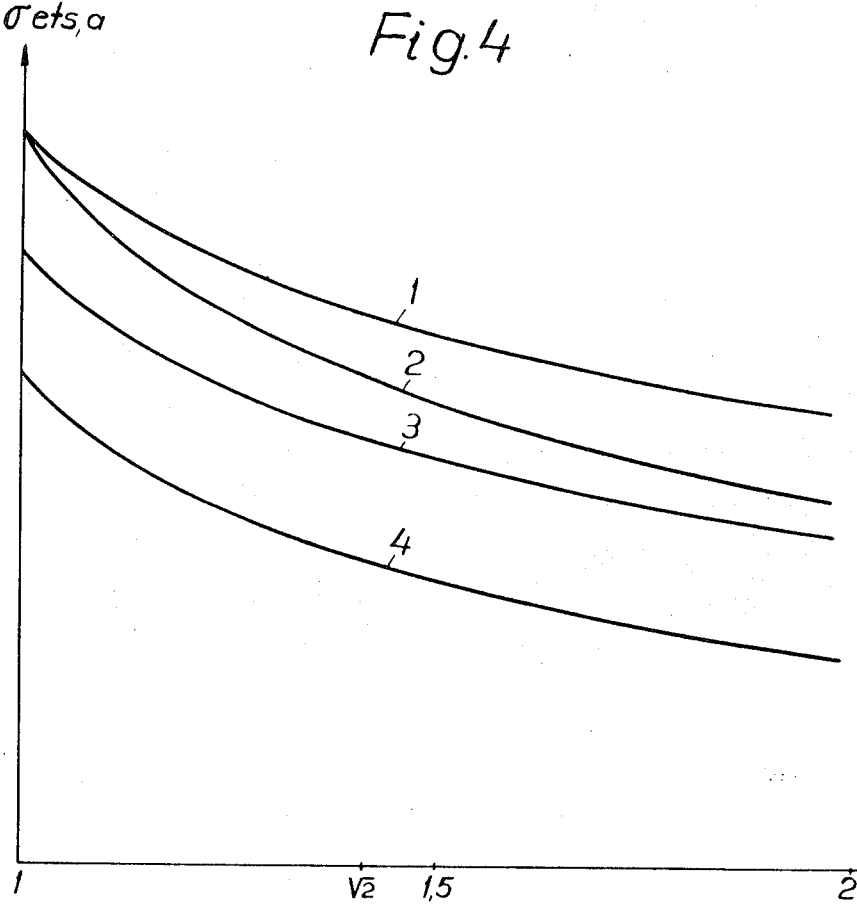
FIG. 4 shows a graph of the amplitude of the equivalent tensile stress at the inner surface of the pressure-absorbing cylinder as a function of the diameter ratio $d_2/d_1$ of the support lining.

The great value of the invention is clear from FIG. 4 where curves show how the equivalent stress amplitude $\sigma$ ets, $a$ can be reduced by using an inner support tube. The figure shows the equivalent tensile stress amplitude at the inner surface of the tube 2 as a function of the diameter ratio $d_2/d_1$ of the support tube 1, where $d_2$ is the outer diameter of the support tube 1 and $d_1$ its inner diameter. The curves 1, 2 and 3 show the situation for cylinders for 30, 25 and 20 kilobar provided with support tubes which when the cylinder is unloaded are subjected to a tangential stress of 300 kg./mm.² due to prestressing in the tube 2 and the sheath 3. This is permissible when the support tube is made of high-speed steel. The curve 4 shows the situation for a cylinder for 30 kilobar provided with a support tube which, when the cylinder is unloaded due to prestressing of the tube 2 and the sheath 3, is subjected to a tangential stress of 400 kg./mm.². This the result achievable when the support tube is made of hard metal (carbide).

The invention is of course not limited to the embodiment shown in the drawings. Many variations are feasible within the scope of the following claims.

I claim:

1. High-pressure cylinder comprising an inner metal tube, a prestressed annular outer metal tube around the inner tube and a prestressed metal sheath surrounding the outer tube in which the inner tube takes up pressure from the surrounding outer tube caused by the prestress in the outer tube and the sheath when low pressure prevails in the cylinder, said cylinder having means for providing fluid communication between the interior of the inner tube and a space between the inner and outer tubes, said fluid connection allowing fluid to pass to the inner surface of the outer tube, thus expanding the outer tube and the sheath so that at maximum operating pressure the inner tube lies freely in the outer tube, whereby a gap is formed between the tubes and tensile stresses are prevented in the inner tube.

2. High-pressure cylinder according to claim 1, in which the inner tube (1) comprises a number of tube sectors (1a, 1b, 1c) having longitudinal radial partition surfaces, the spaces between the tube sectors constituting the means for providing communication between the inner tube and the space between the inner and outer tubes.

3. High-pressure cylinder according to claim 1, in which said communication-providing means comprises a number of radial through holes in the wall of the inner tube.

4. High-pressure cylinder according to claim 1, in which said communication-providing means comprises a number of through slits perpendicular to the tube in the wall of the inner tube.

5. High-pressure cylinder according to claim 1, in which the communication-providing means comprises gaps between the end surfaces of the inner tube (1) and the end closures of the high-pressure cylinder opening to the outside of the inner tube.

6. High-pressure cylinder according to claim 1, in which the inner tube consists of at least two parts, the connection comprising a gap between the end surfaces of these two parts.

* * * * *